United States Patent [19]
Wettengel

[11] Patent Number: 5,091,907
[45] Date of Patent: Feb. 25, 1992

[54] MULTIPLEXER AND DEMULTIPLEXER, PARTICULARLY FOR INFORMATION TRANSMISSION NETWORKS WITH A SYNCHRONOUS HIERARCHY OF THE DIGITAL SIGNALS

[75] Inventor: Heinz Wettengel, Ditzingen, Fed. Rep. of Germany

[73] Assignee: Alcatel N.V., Netherlands

[21] Appl. No.: 596,866

[22] Filed: Oct. 12, 1990

[30] Foreign Application Priority Data

Oct. 13, 1989 [DE] Fed. Rep. of Germany ....... 3934248

[51] Int. Cl.$^5$ .................................................. H04J 3/06
[52] U.S. Cl. ..................................... 370/102; 370/99; 370/84
[58] Field of Search ............... 370/112, 102, 99, 110.1, 370/84, 82, 111, 101; 375/112, 106

[56] References Cited

U.S. PATENT DOCUMENTS

| | | | |
|---|---|---|---|
| 4,224,473 | 9/1980 | Kaul et al. ............................ | 370/84 |
| 4,545,052 | 10/1985 | Steierman ............................ | 370/99 |
| 4,807,221 | 2/1989 | Stummer ............................ | 370/102 |
| 4,827,475 | 5/1989 | Grover et al. ..................... | 370/110.1 |
| 4,920,547 | 4/1990 | Murakami ............................ | 370/102 |

FOREIGN PATENT DOCUMENTS 2218598 11/1989 United Kingdom ................ 370/102

OTHER PUBLICATIONS

CCITT Recommendations G.707, G.708, & G.709.
"Die Neve Synchrone Digitale Hierarchie," W. Ehrlich and K. Eberspächer, NTx Bd. 41(1988), Heft 10, pp. 570-574.
"Synchrones Optisches Netz-Ein Flexibles Netzkonzept für die 9034 Jahre", R. Wentzel, PKI Tech. MIT-TI/1989, pp. 7-16.
"Positiv-Null-Negativ-Stopftechnik für die Multiplex-übertragung Plesioshroner Datensignale", V. F. Kühne and K. Lang, FREQUENZ 32 (1978) 10, pp. 281-287.

Primary Examiner—Douglas W. Olms
Assistant Examiner—Shick Hom
Attorney, Agent, or Firm—Peter C. Van Der Sluys

[57] ABSTRACT

Information transmission networks with a synchronous hierarchy of digital signals, require that digital signals of the plesiochronous hierarchy are to be inserted into multiplex elements with prescribed pulse frames. The pulse frame is structured word by word, but a larger or smaller number of bits must be stuffed in a bitwise manner at the end of specific words. A multiplexer for the resolution of such a pulse frame and elimination of the stuffing bits are provided. The multiplexer operates in a word-by-word manner and repeats the replaced bits of the digital signal at the starting bits of the next word. In a similar manner, the demultiplexer also operates word by word and eliminates the stuffing bits contained in a word, by overwriting them in an elastic memory during writing-in of the next word. In both cases, this is achieved by a controllable shift of memory addresses.

9 Claims, 8 Drawing Sheets

MULTIPLEXER AND DEMULTIPLEXER, PARTICULARLY FOR INFORMATION TRANSMISSION NETWORKS WITH A SYNCHRONOUS HIERARCHY OF THE DIGITAL SIGNALS

BACKGROUND OF THE INVENTION

1. Field of the Invention

The invention relates to a multiplexer and a demultiplexer for use in a synchronous digital information transmission network.

2. Description of the Prior Art

In CCITT Recommendations G.707, G.708 and G.709, a synchronous hierarchy of the digital signals is specified. In this, specific multiplex signals, also called multiplex elements, are precisely specified with respect to bit sequence frequency and structure of the pulse frame, e.g., so-called 'virtual containers'. If a digital signal of the plesiochronous hierarchy, e.g., a multiplex signal with 139,264 Kbit/s of the fourth stage of the European hierarchy or, for example, a digital television signal coded with the same bit sequence frequency is to be transmitted in a transmission network with the synchronous hierarchy, then it is provided that this signal is inserted into the multiplex signal corresponding to it, the so-called 'virtual container'. Insertion is referred to as 'mapping' in the above-mentioned CCITT Recommendations. It consists of the addition of additional words, called 'bytes', for adaptation to the bit sequence frequency or transmission capacity of the particular multiplex signal and of the bitwise stuffing for frequency matching.

The new hierarchy and the associated regulations on the insertion of signals from other hierarchies are described in NTZ Vol. 41 (1988) No. 10, pp. 570-574 and in PKI Tech. Mitt. 1/1989, pp. 7-16. In the first reference mentioned, FIG. 4, which corresponds to FIG. 5.3 of CCITT Recommendation G.709, shows a regulation for the insertion of a useful signal with a bit sequence frequency of 139,264 Kbit/s into a virtual container VC-4. From this regulation and from corresponding regulations for the insertion of other digital signals into corresponding virtual containers, the task arises of creating a circuit arrangement serving to produce a multiplex signal with the prescribed pulse frame from a digital signal and from the additional information to be added, and also of creating a circuit arrangement which again resolves a multiplex signal of this type on the receiving side and recovers the original digital signal from it.

Circuit arrangements of this type can be referred to, in the broader sense, as multiplexers or demultiplexers, because they generate or resolve a digital time-division multiplex signal with a specific pulse frame. They differ from multiplexers and demultiplexers in the narrower sense, e.g., according to definitions 3011 and 3012 in CCITT Recommendation G.702, by the fact that the time-division multiplex signal controlled or resolved by them is not made up of two or more digital signals, but consists essentially of a single digital signal into which additional information and stuffing bits have been inserted.

From the above-mentioned regulation for the pulse frame of the multiplex signal of, for example, one with the virtual container VC-4, the following problems arise, which must be solved in the creation of a multiplexer and demultiplexer for this pulse frame:

A relatively high bit sequence frequency of 139,264 Kbit/s is to be processed. Bitwise processing will therefore require a technology that has the disadvantage of a high, and usually even unacceptable, power consumption.

2. The pulse frame of the time-division multiplex signal is structured word by word, in that it consists of successive 8-bit words. (In the above-mentioned publication NTZ, this property is referred to as 'byte oriented frame structure'.) From this, a word-by-word processing, with the advantage of a processing frequency reduced by a factor of 8, would offer itself. On the other hand, however, it is also described that bitwise stuffing is carried out at a specific word position Z, in that at least the last bit R of the Z-word must be stuffed and the next-to-last bit, as required, is or is not a stuffing bit.

This results in the task of the invention, of creating a multiplexer and a demultiplexer which, in accordance with the word structure of the time-division multiplex signal, operates word by word and is nevertheless in a position to carry out bitwise stuffing or to eliminate stuffing bits contained in the pulse frame in a bitwise manner.

It must be pointed out that a task of this type has not yet arisen in the case of known multiplexers and demultiplexers. These either operate bitwise and also stuff bitwise, such as, for example, the multiplexer known from *Frecuenz* 32 (1978) 10, pp. 281-287, or they operate word by word and do not stuff at all or stuff word by word.

SUMMARY OF THE INVENTION

The present invention contemplates the development of both a multiplexer and a demultiplexer.

The multiplexer combines a digital signal and digital additional information into a time-division multiplex signal of the type having a pulse frame structured from successive n-bit words and containing in at least one word position a stuffing word which contains stuffing bits of undefined state in at least its last bit position and bits of the digital signal in the other bit positions. The multiplexer includes means for forming the pulse frame by combining the successive n-bit words word by word, and means for forming a stuffing word from bits of the digital signal and for repeating those bits of the stuffing word which are to be stuffing bits at the beginning of the subsequently formed word.

The demultiplexer separates a time-division multiplex signal composed of a digital signal, digital additional information, and stuffing bits. The pulse frame of the time-division multiplex signal is structured from successive n-bit words and contains in at least one word position a stuffing word which contains a stuffing bit in at least its last bit position and bits of the digital signal in the other bit positions. The demultiplexer includes a demultiplexing circuit which separates the time-division multiplex signal word by word, in accordance with the structure of the pulse frame, into n-bit words (X, POH, SOH, Au-4, PTR) containing no bits of the digital signal and into n-bit words (DS) containing bits of the digital signal, an elastic memory into which the n-bit words containing bits of the digital signal, including the stuffing words, are written word by word, such that memory cells occupied with stuffing bits during write-in of a stuffing word are overwritten during write-in of the next word, and means for recovering the digital signal by reading out the bits stored in the elastic memory.

Before explaining the invention in detail, some important explanations will be presented, and advantages will be mentioned below for a better understanding of the solution to the problem as characterized above.

In the characterization of the invention, the wording 'digital signal and digital additional information' means that, as explained above, the invention does not involve a multiplexer in the narrower sense. The characterization further describes the new multiplexer by means of the essential properties of the pulse frame of the time-division multiplex signal formed by it. These properties are:

The pulse frame is structured word by word, in that it consists of successive n-bit words. For the above application of a pulse frame according to FIG. 5.3 of CCITT Recommendation G.709, $n=8$, but in general, this can also have a different value.

At least at one word position it contains a word, called a stuffing word, which at least in its last bit position contains stuffing bits with an undefined state and bits of the digital signals in the other bit positions. In the application of the pulse frame according to FIG. 5.3/G.709, a word of this type is the 8-bit word designated by Z, which contains a stuffing bit R in its last bit position, a stuffing bit S in its next-to-last bit position only if required, and bits I of the digital signal in the other bit positions. However, a word of this type is also represented by each of the Y-words contained in the pulse frame, which do not contain any bits of the digital signal, but only stuffing bits R.

The next characteristic is that each of the successive n-bit words in the pulse frame is composed word by word, i.e., that the multiplexer operates essentially word by word and thus with a processing clock distinctly lower than the bit clock of the processed digital signal.

A final characteristic is that the whole stuffing word is made up of bits of the digital signal and a number of stuffing bits; the data bits displaced by the stuffing bits are contained at the beginning of the next word formed. In the example under consideration, this means that all 8-bit positions of the stuffing word Z are occupied by bits I of the digital signal, although for the last bit and, if necessary, for the next-to-last bit, no bits of the digital signal (information bits I) but stuffing bits are provided and that if, for example, not only the last bit but also the next-to-last bit is to be a stuffing bit, the two last bits of the Z-words will be transmitted again as the starting bits of the next word. This complies with the regulation that the two last bits of the stuffing word Z can be considered as stuffing bits, i.e., they can be removed during processing on the receiving side. In this case, the invention makes use of the fact that the state of the stuffing bit has explicitly remained undefined in the regulation on the pulse frame. For the case of a Y-word that must contain stuffing bits R in all bit positions, the solution means that, at the position of this word, eight bits of the digital signal (I bits) are outputted and that these eight bits are repeated, in that they are outputted as the next word.

DESCRIPTION OF THE DRAWINGS

The invention will now be explained in greater detail by examples according to the drawings, in which.

DETAILED DESCRIPTION OF THE INVENTION

The explanation of the invention presented below is based on the example of the insertion of a digital signal with the bit sequence frequency of 139,264 Kbit/s into the useful signal part, the so-called 'payload region', of an STM-1 signal (STM=Synchronous Transport Module), more precisely, into its virtual container VC-4 according to Regulation G.709, FIGS. 5.2 and 5.3. However, the invention is, of course, to be related to any applications involving the problems of bitwise stuffing in a pulse frame structured word by word described at the beginning.

Figure 1A:
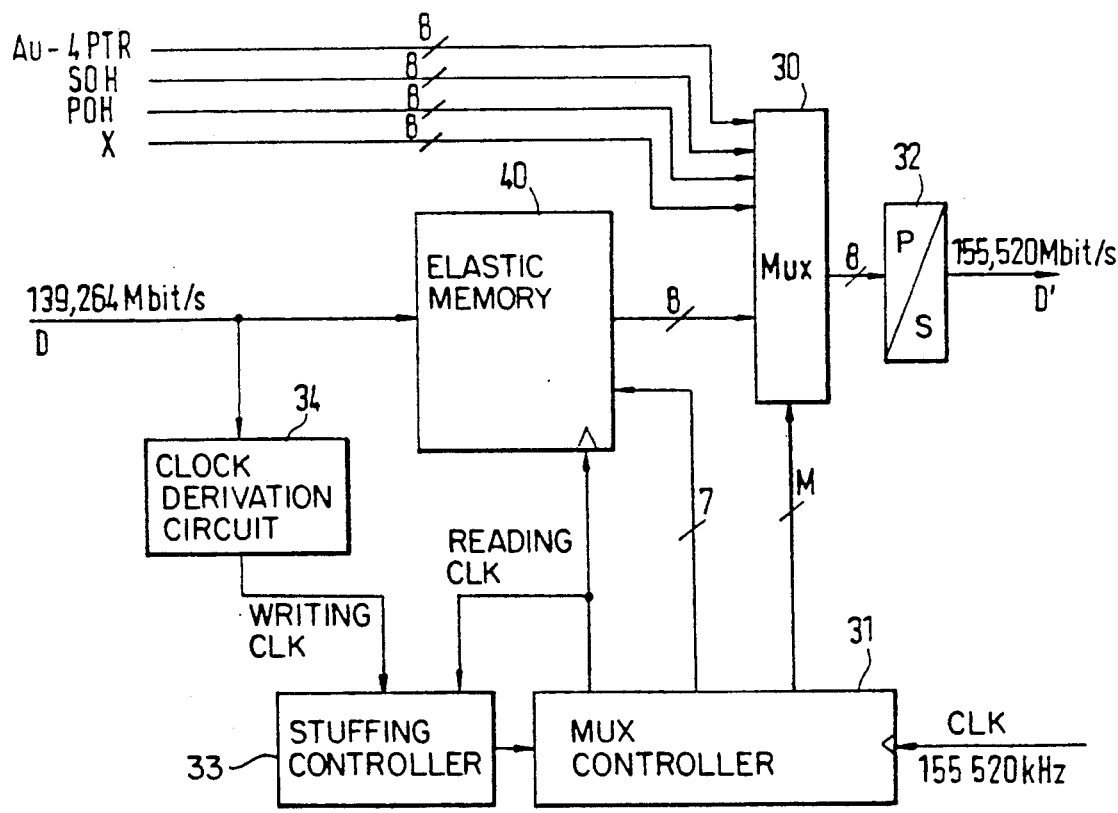
FIG. 1A is a rough block diagram of the multiplexer according to the invention, for the explanation of its essential characteristics.

According to the statement of the problem considered, the multiplexer shown in FIG. 1A has an input D for the digital signal with 139,264 Kbit/s and inputs X, POH, SOH and Au-4 PTR for additional information, which are identified in the same way in the above-mentioned regulation and which originate from memories of any kind (not shown). This additional information consists of only a few bits, which are to be inserted at specific time intervals into the pulse frame to be produced. At the output of the multiplexer there appears the time-division multiplex signal, the so-called STM-1 multiplex element, with the prescribed pulse frame and the prescribed bit sequence frequency of 155,520 Kbit/s, whose essential multiplex element is the so-called virtual container VC-4.

In order that the digital signal and the additional information according to the output clock of the multiplexer and according to the prescribed pulse frame can be assembled into the time-division multiplex signal, the digital signal is written into an elastic memory 40. For the assembly, i.e., for the actual multiplexing, a multiplex circuit 30, which is controlled by a multiplexer controller 31, is used. The multiplex circuit 30 obtains its input signals, one from the output of the elastic memory 40, one from the input X, one from the input POH, one from the input Au-4 PTR, and one from the input SOH, in each case in parallel via an 8-bit bus line. It is thus in a position to combine its output signal word by word, by switching through eight parallel bits to its output, which are either eight bits of the digital signal D, eight bits of the additional information X, eight bits of the additional information POH, eight bits of the additional information Au-4 PTR, or eight bits of the additional information SOH. The sequence of 8-bit words appearing at the output of the multiplex circuit 30, composed of different sources, is converted in a parallel-to-serial converter 32 into the desired serial time-division multiplexed signal D', which is constructed in accordance with the prescribed pulse frame.

For readout of the bits of the digital signal from the memory 40, the multiplexer controller 31, via a clock line, provides a reading clock to the memory 40 and thus specifies the times at which the memory 40, in each case, transmits eight bits from its memory content to its output line to the multiplex circuit 30. Simultaneously with each pulse of the reading clock, the multiplexer controller 31, via a control line M, transmits a signal to the multiplex circuit 30, which causes this to switch through the word read out from the memory 40 from its input connected to the memory output to its output. At times at which one or the other additional information must be present in the pulse frame, the multiplexer controller 31 controls the multiplex circuit 30 in such a way that it switches through this additional information from the corresponding input to the output.

The reading clock thus determines the times at which bits of the digital signal are read out of the memory 40. The reading clock is derived from a clock whose frequency of 155,520 KHz is identical to the bit sequence frequency of the time-division multiplex signal to be generated by the multiplexer. This clock is a clock of the synchronous network and is applied to a clock input of the multiplexer controller 31. Since the clock of the digital signal can vary in time as compared to the clock of the synchronous network (since it does not originate from this synchronous network), it is provided, if necessary, to insert a stuffing bit into the time-division multiplex signal. Whether this requirement exists is determined by a stuffing control 33, which compares the reading clock with a writing clock with which the digital signal applied to the input D is written into the memory. The writing clock is produced by a clock derivation circuit 34, which initially derives the bit clock from the digital signal and divides this by 8 with any desired phase. The stuffing control continuously counts the pulses of the reading clock and the pulses of the writing clock, determines whether stuffing must be carried out at the next opportunity, and signals this to the multiplexer controller 31.

Figure 1B:
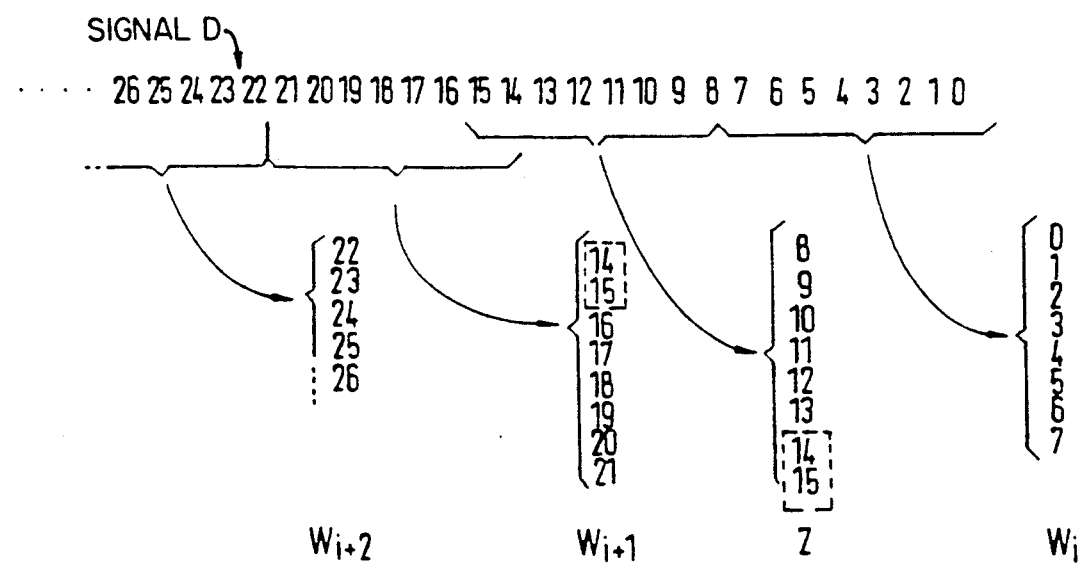
FIG. 1B shows schematically the method of operation of the multiplexer according to FIG. 1A by means of a numbered sequence of bits of the digital signal D.

In order that, despite the word-by-word processing described above, the prescribed bitwise stuffing will be possible at the word position Z of the pulse frame, the multiplexer controller 31 controls the readout of the digital signal from the memory 40 and thus the whole multiplexer, as is shown schematically in FIG. 1B.

Successive words in the pulse frame, consisting of bits of the digital signal, are read out successively from the memory 40, with the sequence of the bits not being changed with respect to the sequence with which they appear at the input of the memory, i.e., such words are the result of a serial-to-parallel conversion with a word clock determined by the multiplexer controller that has taken place in the memory or before the memory. FIG. 1B shows an excerpt of a bit sequence of the digital signal, which is inputted into the memory from the input D. The bits of the bit sequence are numbered continuously from right to left, starting with 0. $W_i$ represents a word formed by word-by-word readout from the bits of the bit sequence numbered 0-7. If a word of this type is followed in the pulse frame by the word Z, which is to contain one and, if necessary, also two stuffing bits at its end, then, according to the invention, this word is also formed from the following bits 8-15, in that these bits are switched through in parallel to the output of the memory 40 as the word Z, which can also be called a stuffing word. The next word $W_{i+1}$ which, according to the pulse frame, is to consist exclusively of bits of the digital signal, is now not formed from the bits 16-24, following the bits of the word Z, but from the bits 14-21, i.e., at the beginning of this word $W_{i+1}$, the bits 14 and 15 of the word Z are initially repeated, since these bits occupy the last two bit positions of the Z word, which should, however, contain two stuffing bits.

In other words: The multiplexer controller makes sure that a stuffing word Z is also formed by readout of eight bits from the memory following the previous word, and that then, to form the next word, a number x (e.g., 2) of bits of the end of the Z word are read out repeatedly before these are followed by new bits, if the Z word is to contain x stuffing bits. Any circuit can be used as the memory 40 with which it is possible, as shown by means of FIG. 1B, to either read out groups of successive bits or to deviate from this normal sequence, in that, during readout, at least one of the last bits of a word is repeated at the beginning of the next word.

In this manner, as shown impressively by FIG. 1B, it is achieved that all words of the pulse frame are formed word by word, because a complete word is formed in each readout process, and that nevertheless, as required, at least the last bit, or in the example shown according to FIG. 1B, the last two bits, are stuffing bits, i.e., that these can be removed again in a demultiplexer processing the time-division multiplex signal. For this purpose, the invention makes use of the fact that the state of the stuffing bits has remained explicitly undefined in the regulation and that the digital signal can be processed without consideration of its internal structure.

Figure 2A:
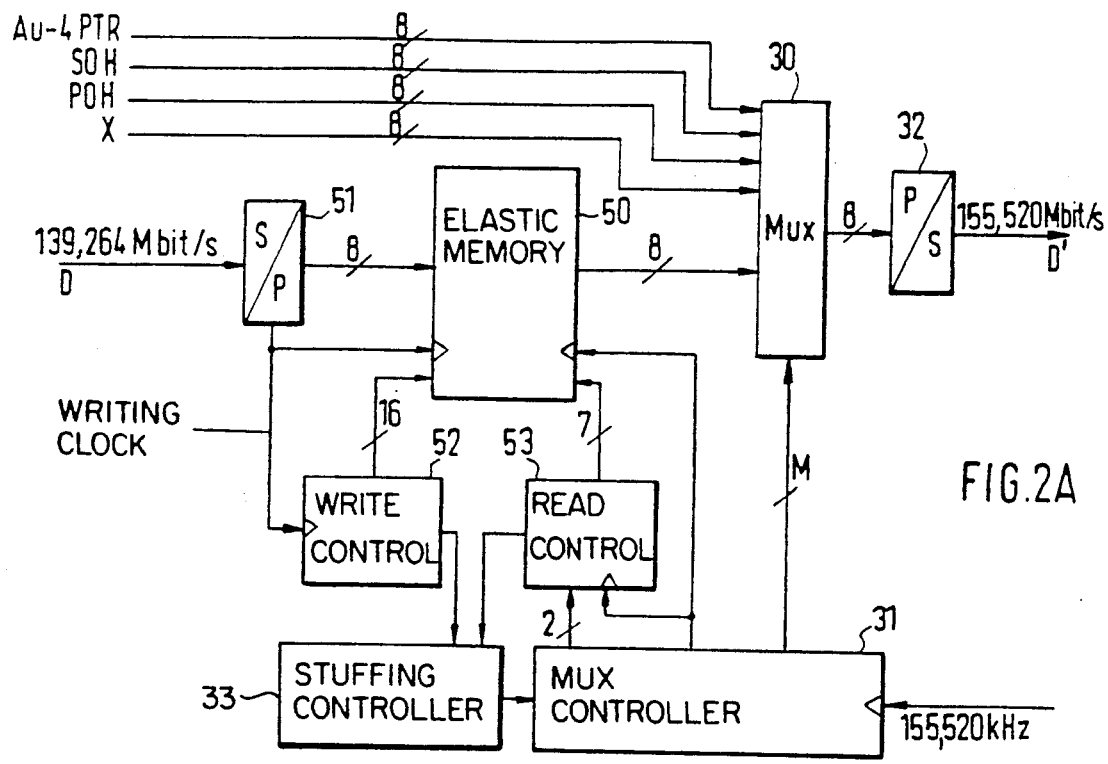
FIG. 2A shows a block diagram of an exemplifying embodiment of the new multiplexer.
Figure 2B:
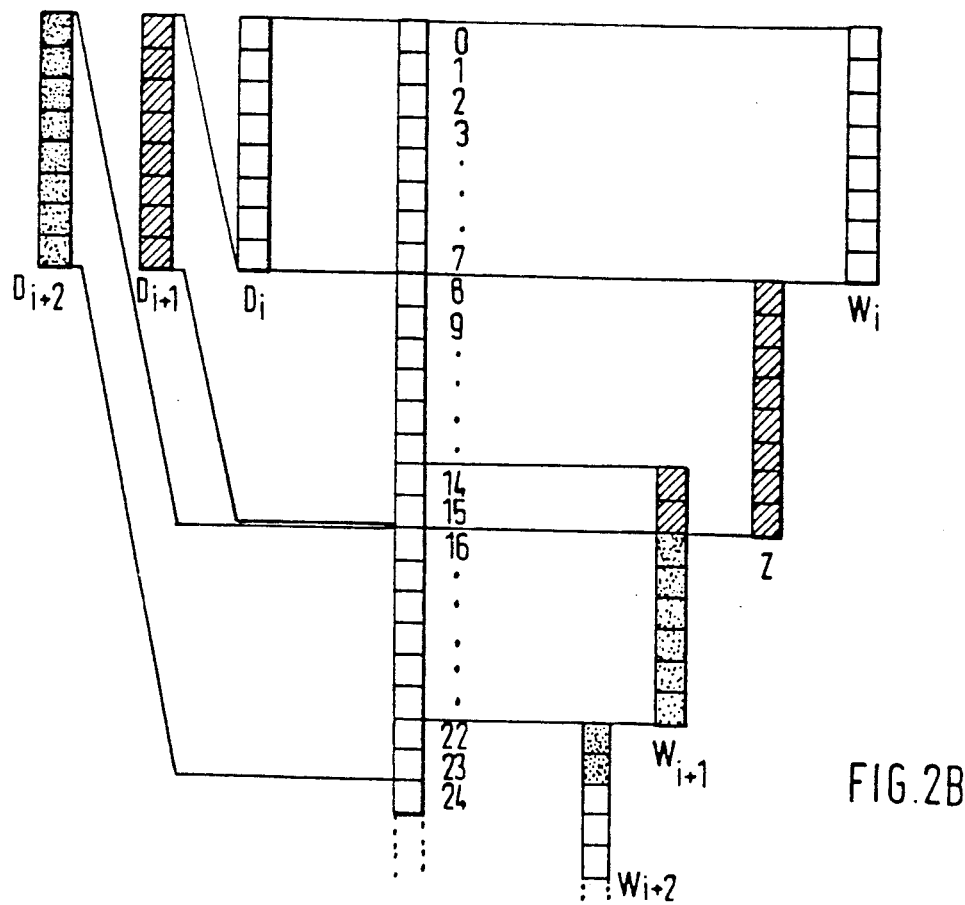
FIG. 2B shows schematically the input of a bit sequence of the digital signal D into the elastic memory of the multiplexer according to FIG. 2A and the output of the words succeeding each other in the pulse frame, for explanation of the exemplifying embodiment according to FIG. 2A.

With reference to FIGS. 2A and 2B, a more detailed exemplifying embodiment of the elastic memory and of its activation according to the invention will now be explained, which complies with the principle of the invention represented schematically by means of FIG. 1B.

The multiplexer according to FIG. 2A differs from that according to FIG. 1A by the fact that the elastic memory, which in this case has the reference number 50, has a memory organization that is explained by means of FIG. 2B, by the fact that a serial-to-parallel converter 51 is present for the digital signal, so that the digital signal is inputted in groups of eight bits in parallel into the elastic memory 50, by the fact that a write controller 52 is present, which controls the write-in of the the digital signal, as will be explained later, and by the fact that a read controller 53 is present, which controls the readout of the bits stored in the elastic memory 50, as will be described later.

The other components of the multiplexer do not differ from those of the multiplexer according to FIG. 1A, which is identified by the same reference numbers.

The serial-to-parallel converter 51 converts the digital signal appearing serially at the input D of the multiplexer into successive 8-bit words and outputs these in parallel form at its outputs, from where they are written in this parallel form into the elastic memory 50. The write-in is carried out with the clock with which the serial-to-parallel converter 51 outputs its successive 8-bit words. This clock is thus the writing clock of the elastic memory 50, and it will also be referred to as word clock below. Since the internal structure of the digital signal plays no role for the transmission over the synchronous network (transparent transmission), the word limits that the serial-to-parallel converter specifies by its method of operation are arbitrary, i.e., the phase of its word clock is arbitrary.

The write controller 52 operates with this word clock and determines the memory positions in which an 8-bit word outputted by the serial-to-parallel converter 51 is written into the elastic memory in each case, by generating write addresses and controlling the write-in accordingly.

In the same way that the word clock of the serial-to-parallel converter 51 determines the write-in times for the write-in, a reading clock generated by the multiplexer controller 31 determines the times at which an 8-bit word is read out in parallel form from the elastic memory 50. The memory positions from which it is to be read out in each case are determined by the read controller 53, by the fact it generates read addresses and controls the readout accordingly.

FIG. 2B schematically shows the organization of the elastic memory 50 and the control of the write-in and readout according to the invention. The elastic memory has as its memory cells a parallel arrangement of, for example, 128 1-bit memory cells and can thus simultaneously store 128 bits = 16 8-bit words. FIG. 2B shows a part of these memory cells, which are numbered continuously, starting with 0. The write controller 52 controls a circuit (not shown) connected ahead of the memory cells, so that successive bits of the digital signal occupy memory cells with successive addresses. This means that the first eight bits ($D_i$) of the digital signal are written into the first eight memory cells, which are numbered 0-7, the second eight bits ($D_{i+1}$) of the digital signal are written into the second eight storage cells, numbered 8-15, and the third eight bits ($D_{i+2}$) of the digital signal are written into the next memory cells, i.e., cells 16-23, etc. This write-in is carried out, as shown symbolically in FIG. 2B, word by word and in parallel form. (The first word is indicated by eight empty boxes, the second word by eight hatched boxes, and the third word by eight dotted boxes.)

The readout is now controlled by the read controller 53 via a logic circuit (not shown) in such a way that successively written-in words are also read out successively word by word when the pulse frame to be generated demands words that are to consist only of bits of the digital signal; for example, the word $W_i$ is such a word.

However, even if the pulse frame demands a stuffing word Z, whose last bit or whose last two bits are to be stuffing bits, the readout proceeds in this manner, as shown in FIG. 2B, in that the word located in the memory as the word following the previously-outputted word $W_i$ (the eight hatched boxes) is outputted as the Z word.

The read addresses are thus increased by eight with each pulse of the reading clock, as long as the readout functions in this manner. After the readout of the Z word which, for example, is to contain two stuffing bits, however, a deviation is made from this manner of operation, in that, at the next readout time, the reading address is not increased by eight, but only by six. The word ($W_{i+1}$) following the Z word is thus not read out from the memory cells 16-23, but from the memory cells 14-21, so that, as shown by the symbolic method of representation, the two last bits of the Z words (from the memory cells 14 and 15) are repeated at the beginning of the word $W_{i+1}$ following the Z word. The word $W_{i+2}$ following the word $W_{i+1}$ is again obtained by a 'normal' increase of the reading addresses by eight, i.e., starting with the memory cell 22. The words $W_i$, Z and $W_{i+1}$ shown in FIG. 2B thus have the same property as the correspondingly designated words shown in FIG. 1B, that a repetition of the bits that are to be contained in the stuffing word Z takes place in the next word inserted into the pulse frame.

How many bits are repeated depends on how many bits in the Z word are to be stuffing bits. In the example, the case in which the last two bits are to be stuffing bits is shown. As can be readily seen, an arbitrary number of stuffing bits can be considered, insofar as these stuffing bits form the end of the Z word, as is the case in the regulation mentioned at the beginning.

In general, therefore, the reading addresses are shifted by 8-x with each clock pulse, with x being the number of stuffing bits are to be contained in one word of the pulse frame.

If a word, such as the word Y in the above-mentioned prescribed pulse frame, is to consist exclusively of stuffing bits, then x = 8, which means that it is formed exclusively of bits of the digital signal and that, during readout of the next word, the reading addresses are not shifted at all, so that the word following the stuffing word Y repeats all the bits of the stuffing word. If a word is to consist only of bits of the digital signal, then x = 0, i.e., after the readout of such a word, the reading addresses are shifted by eight.

Figure 3A:
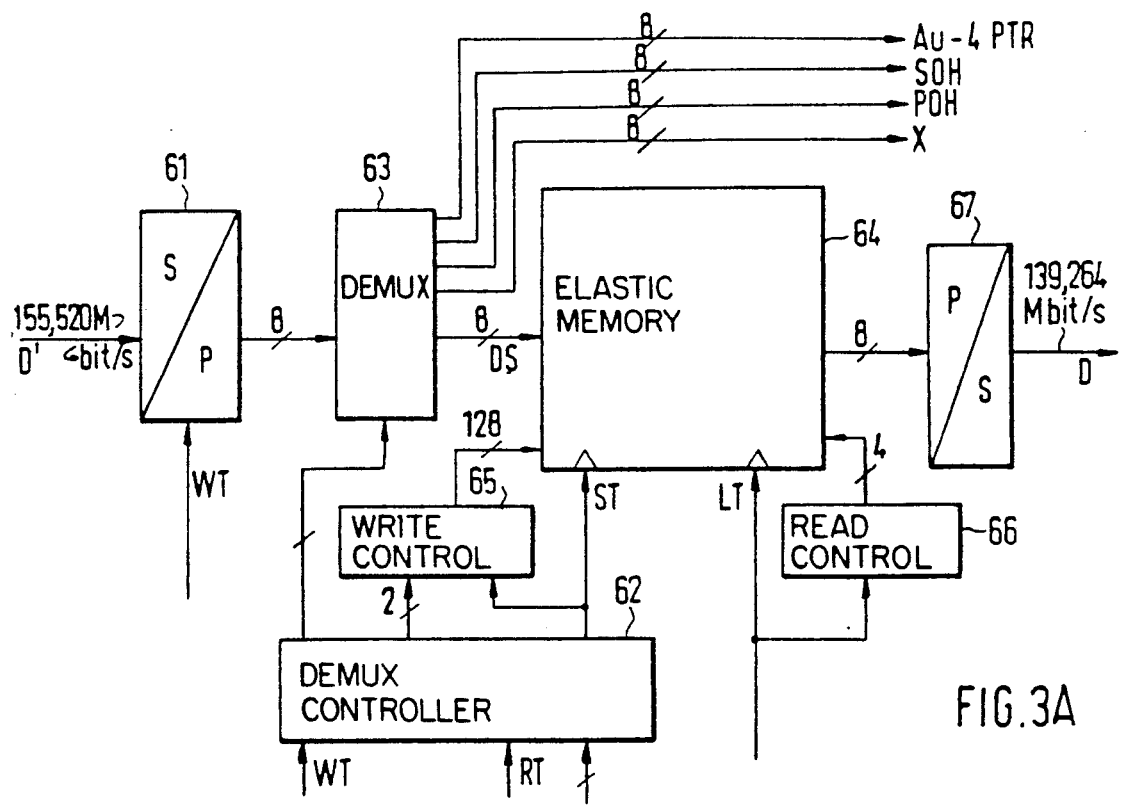
FIG. 3A shows a block diagram of the demultiplexer according to the invention.

FIG. 3A shows a block diagram of a demultiplexer for a digital signal with a pulse frame with a word-by-word structure, which has been stuffed in a bitwise manner. For example, a multiplex signal STM-1 according to CCITT Recommendation G.709 is such a digital signal, if it contains a virtual container VC-4 according to FIG. 5.3 of the same recommendation. Its bit sequence frequency has a value of 155.520 Mbit/s. A digital signal of this type, designated by D', passes from the input of the multiplexer in serial form to the input of the serial-to-parallel converter 61 and is converted there according to its pulse frame into 8-bit words, which appear in parallel form at its output. The word clock of the digital signal D' required for this purpose is derived by a synchronizing circuit (not shown) from the digital signal D' and is transmitted to a clock input of the serial-to-parallel converter 61.

In addition to the word clock, the synchronizing circuit (not shown) also derives the frame clock from the received digital signal D' and transmits the word clock WT and the frame clock RT to a demultiplexer controller 62, so that this is in a position to separate the receive digital signal D' according to its pulse frame.

For this purpose, the demultiplexer controller 62 controls a demultiplex circuit 63, which receives at its input the sequence of 8-bit words in parallel form outputted by the output of the serial-to-parallel converter. The demultiplex circuit 63 is controlled by the demultiplexer controller 62 in such a way that it outputs the additional information POH, SOH, Au-4 PTR and X contained in the time-division multiplex signal D' to the outputs designated in the same manner and outputs those words of the time-division multiplex signal D' containing bits of the digital signal at another output, which is designated by DS. The latter words are words composed of bits of the digital signal and stuffing words, which contain both bits of the digital signal and also (at their end) a larger or smaller number of stuffing bits.

The above-mentioned sequence DS of words containing bits of the digital signal is inputted into an elastic memory 64, which has the task of eliminating stuffing bits and ensuring a clock alignment. The clock alignment takes place as a result of the fact that the write-in of the words of the sequence DS takes place with a writing clock ST that is derived by the demultiplexer controller from the frame clock RT and from the word clock WT of the digital signal D' and, thus, from the synchronous network and that the readout from the memory takes place with a reading clock LT which, as will be explained later on, is produced by a local oscillator. As shown by the drawing, both the write-in into the elastic memory and the readout from the elastic memory, and also the separation of the digital signal D' in the demultiplexer circuit 63, proceed word by word, so that the predominant part of the demultiplexer has the advantage of operating with a relatively low clock frequency.

Despite this word-by-word processing, as will be explained below, the task of eliminating the bits stuffed in a bitwise manner is solved. The writing clock ST determines the times at which a word of the word sequence DS outputted by the demultiplex circuit 63 is inputted into the elastic memory. These are simply the times at which it is outputted from the demultiplexer, i.e., the times at which the demultiplexer outputs an output word on its line designated by DS. The write controller 65 controls the memory cells of the elastic memory 64 into which a word of the word sequence DS is written. On the other side of the elastic memory 64, the read controller 66 controls the memory cells from which an 8-bit word is read out if a pulse of the reading clock determines that such a word is read out.

The write controller 65 is controlled by the demultiplexer controller 62, which signals to it whether a word about to be written in is a stuffing word and how many stuffing bits it contains. For this purpose, the demultiplexer controller 62 again receives a stuffing information, which the demultiplexer obtains from the received additional information X by means of a stuffing evaluation (not shown).

Figure 3B:
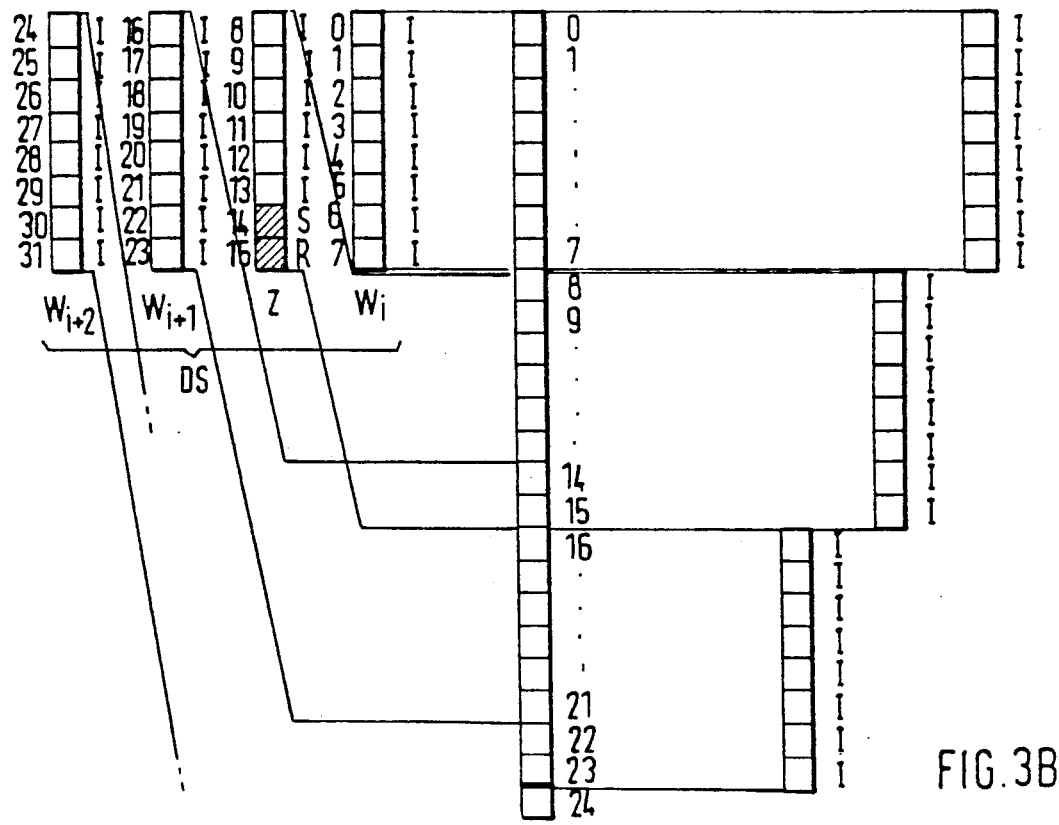
FIG. 3B shows schematically the method of operation of the demultiplexer according to FIG. 3A by means of a word sequence DS, containing a stuffing word (Z).

By means of FIG. 3B, the manner in which the write controller 65 controls the write-in into the elastic memory 64 will now be shown. The elastic memory has as its memory cells a parallel arrangement of, e.g., 128 1-bit memory cells, and can therefore simultaneously store 128 bits = 16 8-bit words. Part of these memory cells is shown in FIG. 3B, numbered continuously, starting with 0. On the left side of the memory cells, words of the word sequence DS to be processed are shown schematically. The part of this word sequence shown consists of a first word $W_i$, which contains only bits I of the digital signal, a second word Z, which is a stuffing word, and, in its last bit positions, two stuffing bits S and R, with the remainder consisting of bits I of the digital signal, and two other words $W_{i+1}$ and $W_{i+2}$, consisting exclusively of bits I of the digital signal. The bits of this word sequence are numbered continuously with numbers 0-31, so that the two stuffing bits S and R are the bits with numbers 14 and 15 of this word sequence.

The words of this word sequence are written word by word into the elastic memory, i.e., the first word $W_i$ with a first pulse of the writing clock ST (FIG. 3A), the second word Z with a second pulse of the writing clock ST, etc., with the bits of a word being written in in parallel in each case. The write controller 65 (FIG. 3A) controls a logic circuit (not shown) in such a way that successively entering words, in the normal case, are written into memory cells with successive addresses, i.e., as shown, the first word $W_i$ into memory cells 0-7 and the second word Z into memory cells 8-15. In the special case in which a word written into the memory is a stuffing word and, like the stuffing word Z, for example, contains two stuffing bits S and R in its last two bit positions, the write controller 65 controls the logic circuit in such a manner that the next word $W_{1+1}$ is written into the memory in such a way that the stuffing bits of the previously written-in stuffing word are overwritten in the process. The word $W_{i+1}$ following the Z word is not written up into the memory cells 16-23 but into the memory cells 14-21, so that, in this way, the stuffing bits S and R previously written into the memory cells 14 and 15 are overwritten and are thus eliminated for the further processing. Since the word $W_{i+1}$ does not contain any stuffing bits, the next word $W_{i+2}$ is written into the memory cells with the following memory addresses 22-29.

As the example shows, in each case, after the writing-in of an n-bit word (in the example, n=8) of the sequence DS of words containing bits I of the digital signal D, the write addresses are shifted by n, but only by n-x of the written-in word was a stuffing word, where x is the number of stuffing bits contained in the stuffing word. In this manner, it is achieved that the word sequence, on the one hand, is processed word by word and, on the other hand, is nevertheless freed of a number of larger or smaller stuffing bits (unstuffed) in a bitwise manner.

The described manner of writing-in makes sure that the bits I of the digital signal are stored in the elastic memory according to the sequence with which they are contained in the digital signal. The read controller 66 thus only has to make sure that they are also read out in this manner. In the simplest case, this also occurs word by word, so that, as shown, at a first time, e.g., eight bits 0-7 are read out from the memory cells 0-7; at a second time eight bits 8-15 are read out from the memory cells 8-15; and at a third time eight bits are read out from the memory cells 16-23, etc., in each case in parallel form. By means of a simple parallel-to-serial conversion in a parallel-to-serial converter 67 (FIG. 3A), the transmitted digital signal D with the bit sequence frequency of 139.264 Mbit/s is formed from this word sequence.

In the same manner as the word-clock phase can be selected arbitrarily in the write-in of the digital signal D into the elastic memory 50 of the demultiplexer according to FIG. 2A, the word-clock phase can also be selected arbitrarily in the readout from the elastic memory 64 of the demultiplexer according to FIG. 3A, since the digital signal D can be transmitted without consideration of its internal structure, i.e., in a transparent manner.

Any control circuit performing what is represented in FIG. 3B is suitable as a write controller 65 and read controller 66.

In the exemplifying embodiment described above, the word sequence DS is only a part of the word sequence outputted by the serial-to-parallel converter 61. This is because this consists only of words containing bits I of the digital signal, either exclusively or in part.

According to an advantageous alternative, the whole word sequence, as it is outputted by the serial-to-parallel converter 61, can also be inputted into the elastic memory 64. The demultiplex circuit in this case operates in such a way that, although, as shown, it outputs the additional information, such as SOH, POH, X, Au-4 PTR at the correspondingly designated outputs, it leaves them in the word sequence that it transmits to the elastic memory 64. In that case, the write controller controls the write-in in such a way that, after the write-in of such a word, the write addresses are not shifted at all and the written-in word is then overwritten. In other words: Whenever any memory cells are occupied by such a word, they are overwritten by the next word, so that a word of this type no longer exists at the time of readout of the memory, as if it had not been written in at all. This alternative has the advantage that the word clock WT, which is a gapless clock, can be used as the clock for the write controller and as the writing clock, and that it is not necessary to generate a gap-containing clock in the demultiplexer controller which masks out such words.

With respect to the elastic memory, it must also be stated that both the write-in and the readout proceed cyclically, i.e., that, after the writing in into the memory cells with the highest memory addresses or reading out from the memory cells with the highest memory addresses, additional writing in or reading out is continued, starting with the lowest memory addresses. The shifting of the memory addresses in the write and read controller is taken care of in each case by a cyclic counter, which is advanced by eight for each write-in and readout process in the normal case, with the special feature that, in the read controller of the multiplexer and in the write controller of the demultiplexer, a cyclic counter is contained that is controllable in such a way that it can be optionally advanced by seven, six or, if required, even fewer steps instead of by eight steps.

Exemplifying embodiments of the write controller, the read controller and the logic circuits of the elastic memory will be explained by means of the following figures.

The method of operation of the elastic memory of the multiplexer, including the write controller and the read controller, were roughly explained above by means of FIGS. 2A and 2B. Their structure and mode of operation will now be explained in greater detail by means of FIGS. 4A and 4B. The arrangement in FIG. 2B of 1-bit memory cells, each indicated by one box and being numbered continuously starting with 0, is divided into sixteen blocks SM0-SM15 in FIG. 4A, for simplification, with each of the blocks being a parallel arrangement of eight 1-bit memory cells. The 8-bit input line of the elastic memory 50 shown in FIG. 2A is connected with the inputs of each of the blocks SM0-SM15, so that a data word inputted into the elastic memory in parallel on this line, whose bits are designated by 0-7, can be inputted into each of the memory blocks.

The eight parallel inputs into which a data word can be inputted are designated to each of the blocks by E2, which is intended to mean that each memory cell of a block has an input E2 for one of the bits 0-7. The individual lines of the 8-bit input line of a block are connected with inputs E2 of different 1-bit memory cells of a block, in such a way that bit 0 is applied to the input E2 of the first memory cell, the bit 1 to the input E2 of the second memory cell of a block, etc. The outputs of the block SM0 are designated by Q0-Q7, those of the block SM1 by Q8-Q15, etc., which is intended to mean that, for example, at SM0 the output Q0 is the output of the first 1-bit memory cell of SM0, Q1 is the output of the second memory cell of SM0, etc. As shown, all of the outputs of a block are returned to inputs of corresponding memory cells, which are designated by E1 in each case.

Each memory cell of a block has a control input, which is designated by SLE2 for each block, which means that all eight memory cells of a block receive the same control signal and their control input SLE2. With this control signal, it can be controlled whether a memory cell stores the bit applied to its input E2 or the bit applied to its input E1 (from its output) when a clock pulse appears at its clock input (SLE2=Select E2). For example, in the case of a 1 at the control input, the bit applied to the input E2 is inputted and, in the case of a 0 at the control input, the bit applied to the input E1 is inputted, i.e., in the case of a 1 at the control input, a new bit is inputted into the memory, whereas, in the case of a 0 at the control input, the already stored bit is returned from the output to the input 1, i.e., the state of the memory cell is not changed.

The memory blocks SM0-SM15 in each case receive their control signal via control lines SL0-SL15, i.e., for example, a data word appearing at the input of the memory is stored in the memory block SM0 if SL0=1. If the control signals SL1-SL15 are then equal to 0, then the data word is stored only into the block SM0 and the other memory blocks retain their state. It is thus possible to write in successive data words $D_i$, as shown in FIG. 2B, into successive memory blocks, namely a first word $D_i$ into a memory block consisting of memory cells 0-7 (memory block SM0), a second data word $D_{i+1}$ into a second memory block with memory cells 8-15 (memory block SM1), a third data word $D_{i+2}$ into a third memory block with memory cells 16-23 (memory block SM2), etc.

Figure 4A:
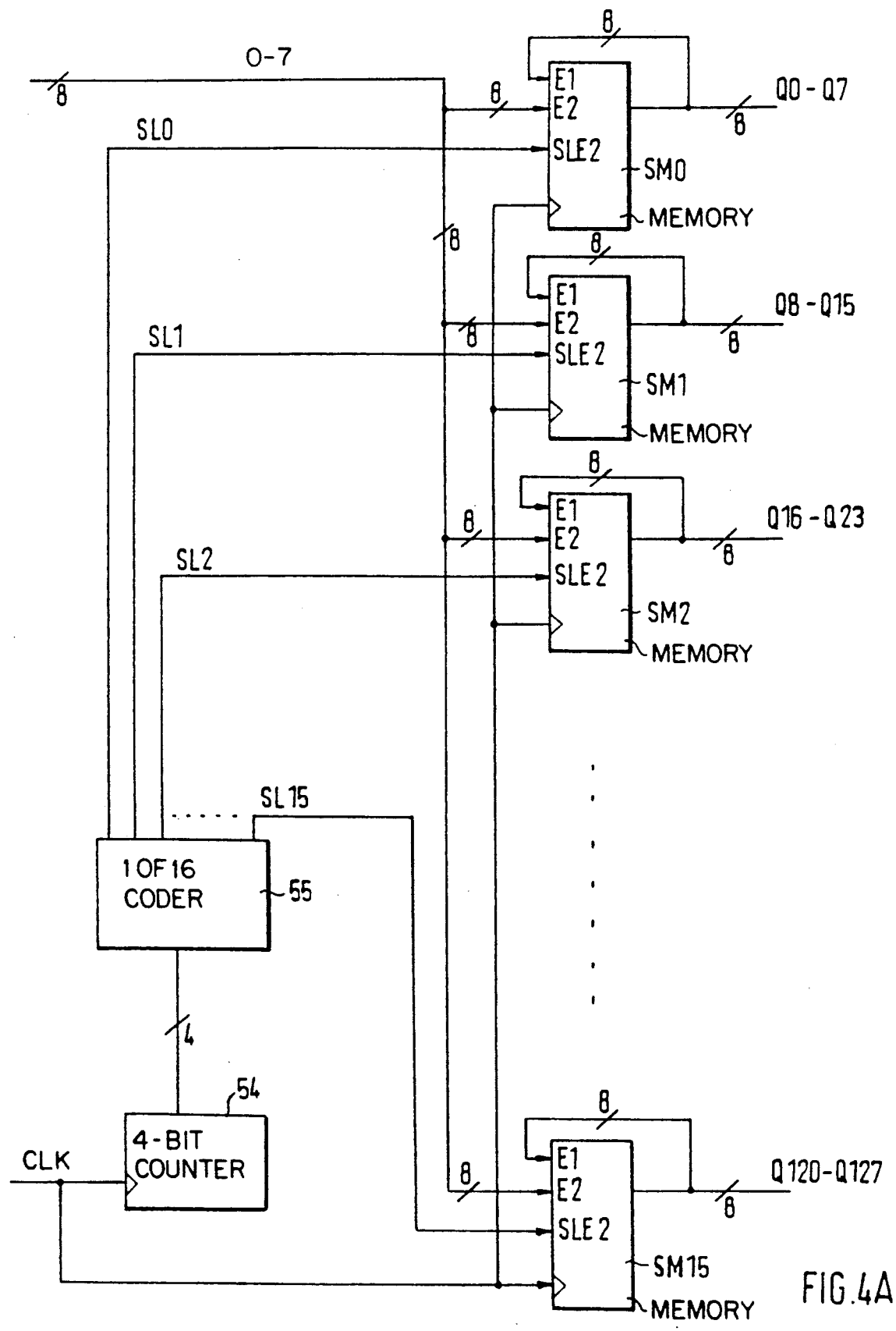
FIGS. 4A and 4B show an exemplifying embodiment of the elastic memory 50 of the multiplexer according to FIG. 2A, with circuits for write-in and readout according to FIG. 2B.

The above-mentioned control signals on the control lines SL0-SL15 are supplied by the write controller 52 shown in FIG. 2, which, according to FIG. 4A, consists of a 4-bit binary counter 54 and a 1-of-16 coder 55. The 4-bit counter 54 receives as a counting clock the writing clock shown in FIG. 2A, i.e., the clock with which the data words are successively inputted into the elastic memory and counts cyclically from 0-15. The coder 55 codes each of the counter readings in such a way that, for each counter reading, it outputs a 1 on exactly one of 16 output lines, namely a 1 on output line SL0 for the counter reading 0000, a 1 on the output line SL1 for the counter reading 0001, a 1 on the output line SL2 for the counter reading 0010, etc., and finally, a 1 on the output line SL15 for the counter reading 1111 (=15). In this way, the bigger words succeeding each other in the writing clock, as shown in FIG. 2B, are written into memory cells with successive addresses.

The memory blocks SM0-SM15 shown have a total of 128 outputs which, as shown, are designated by Q0-Q127.

Figure 4B:
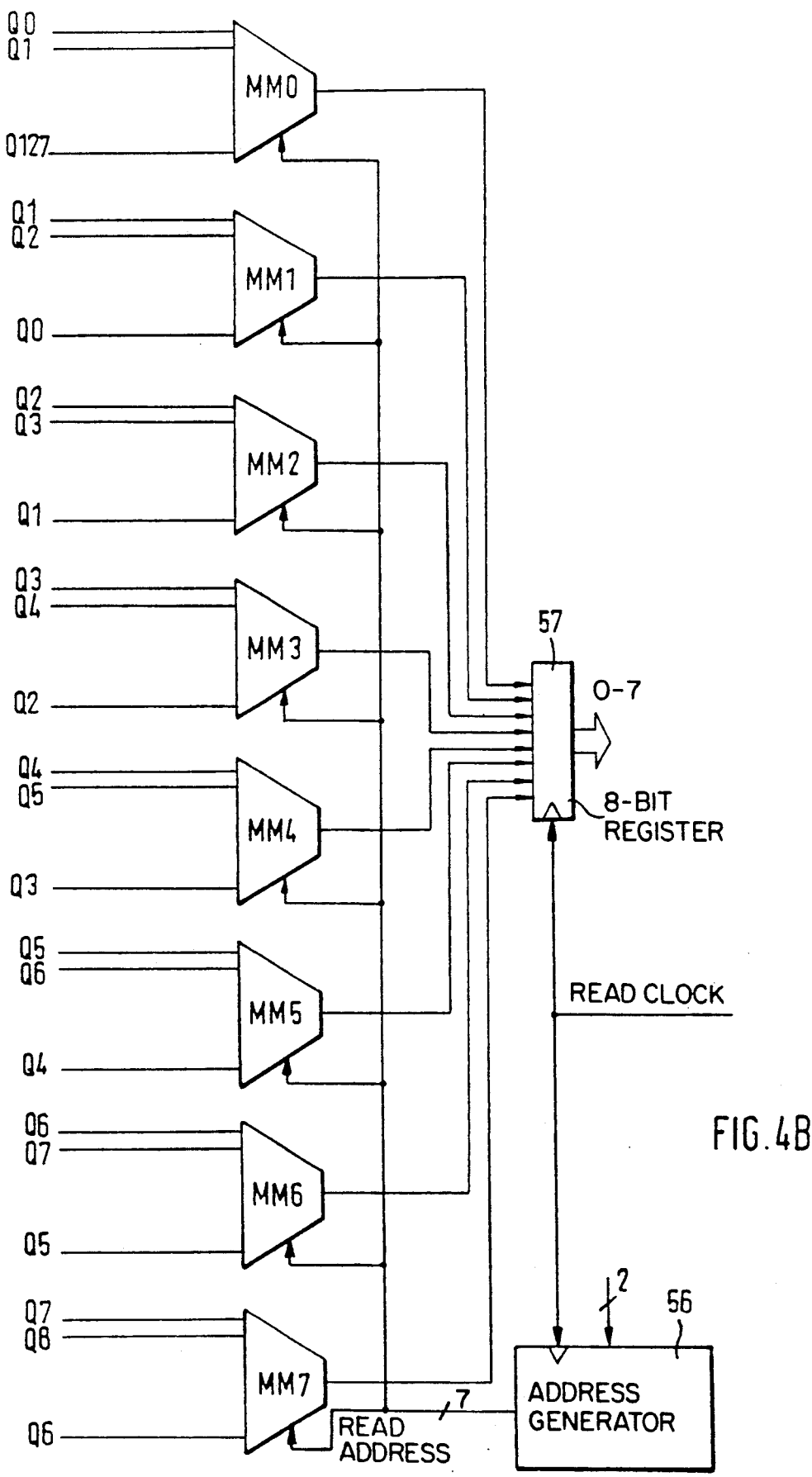

The logic circuit for readout mentioned in connection with FIG. 2B and not shown there, and the read controller 53 are explained in greater detail by means of FIG. 4B. The logic circuit consists of a parallel arrangement of eight multiplex circuits MM0-MM7, each of which has 128 inputs and is in a position, controlled by a 7-bit control word, to switch one of the inputs through to its output. These inputs are connected as follows with the memory outputs shown in FIG. 4A: The outputs Q0-Q7 of the memory block SM0 of FIG. 4A are connected with the first input of each of the multiplex circuits (in the drawing, the top input). A data word outputted at outputs Q0-Q7 is thus applied to the first inputs of the multiplex circuits MM0-MM7. The second inputs of the multiplex circuits are connected with outputs Q1-Q8 of the elastic memory, the third inputs (not shown) with Q2-Q9, etc., and the 128th inputs are connected with the outputs Q127-Q6.

At their control inputs (7 bits), all multiplex circuits receive the same 7-bit control word, the so-called reading address. The multiplex circuits MM0-MM7 operate in such a way that, for a reading address 0, they switch through their first inputs, i.e., the inputs Q0-Q7, to their outputs, for a reading address 1 they switch through their second inputs, i.e., Q1-Q8, etc., e.g., for a reading address 14 (binary 0001110), they switch through their fifteenth inputs Q14-Q21, and for a reading address 127 (binary 1111111) they switch through their last inputs Q127-Q6 to their outputs. In this way, it is possible to select an arbitrary memory address, and, from this memory address and the subsequent seven memory addresses, to read out an 8-bit word from the memory in parallel.

The reading addresses are supplied by an address generator 56 which, as will be explained by means of FIG. 6, generates a reading address with each pulse of the reading clock and thus controls the memory cells from which an 8-bit data word is to be read out if the reading clock determines that one is to be read out.

The reading clock is inputted into the clock input of an 8-bit register 57, so that, with each pulse of the reading clock, a data word with the bits 0-7 is available at the outputs of the register 57 for further processing. The address generator 56 thus has the function of the read controller 53 shown in FIG. 2A. In the same way as that, it receives at a control input a control signal (2 bits in parallel) from the multiplexer controller 31 in FIG. 2A, which determines the amount of the shift in the reading addresses taking place with each pulse of the reading clock.

Figure 5A:
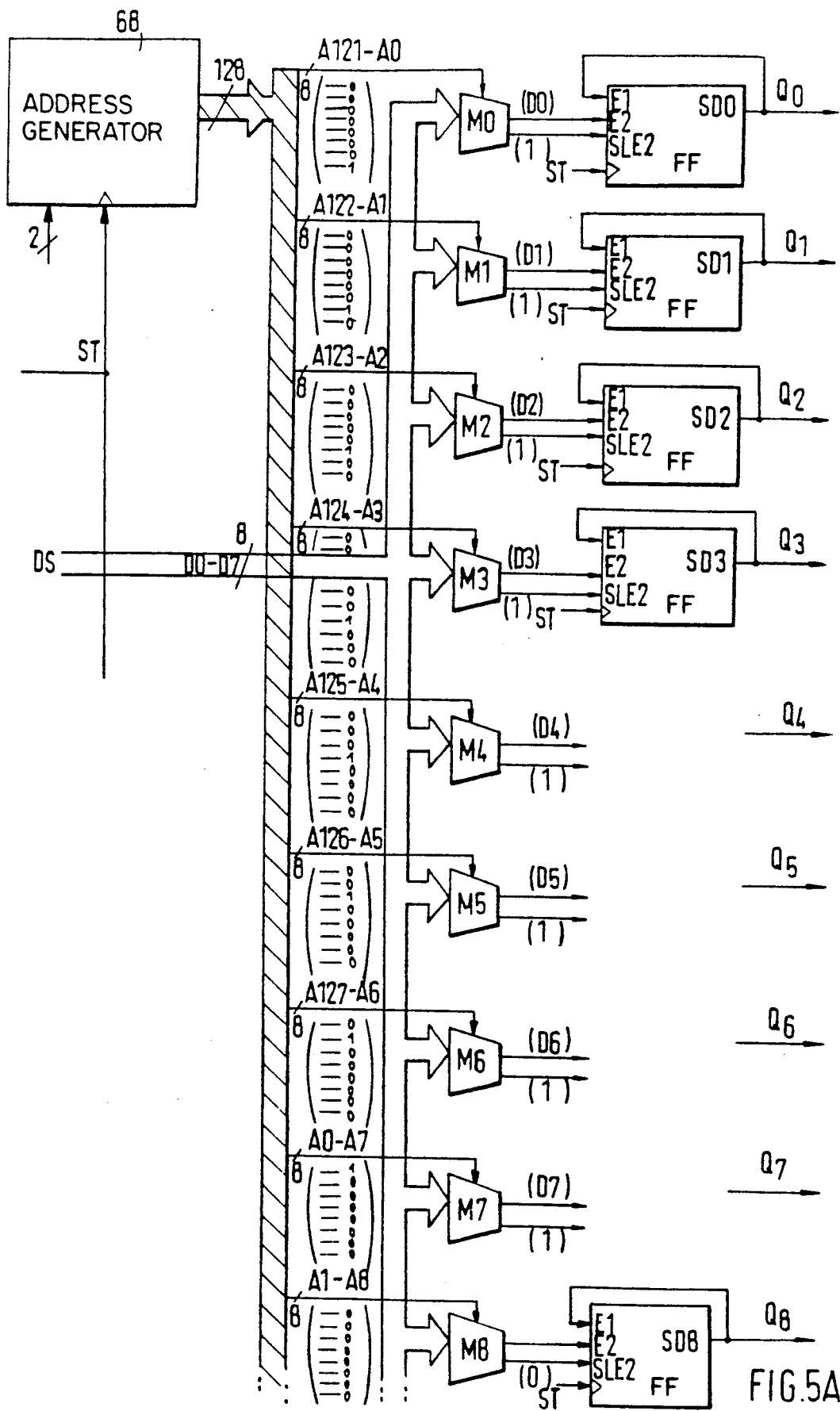
FIGS. 5A and 5B show an exemplifying embodiment of the elastic memory 64 of the demultiplexer according to FIG. 3A, with circuits for write-in and readout according to FIG. 3B.

The writing-in into the elastic memory 64 and the reading out from this were roughly explained by means of FIGS. 3A or 3B. FIG. 5A shows the logic circuit mentioned there, but not shown, and the structure of the elastic memory 64. As indicated in FIG. 3A, in this case also, a sequence DS of 8-bit data words reaches the input of the elastic memory in parallel form. The elastic memory consists of a parallel arrangement of, e.g., 128 1-bit memory cells (flip-flops), of which only a few have been shown and designated by SD0, SD1, etc. The write controller shown in FIG. 3A and the logic circuit (not shown there) have the task of controlling into which eight adjacent memory cells (memory cells with successive addresses) a data word received from the 8-bit input line is to be written.

The logic circuit for writing-in consists of a parallel arrangement of 128 multiplex circuits, of which only a few are shown and designated as M0-M8. Each of these multiplex circuits belongs precisely to one memory cell and therefore has the same number as the associated memory cell. Each of the multiplex circuits has eight parallel data inputs, each for one bit of the data word, which are connected with the eight parallel input lines DS of the elastic memory, so that each data word appearing at the memory input, with the bits 0-7, is applied to the input of each of the multiplex circuits M0-M127.

Each of the multiplex circuits M0-M127 has eight parallel control inputs and, at these, receives an 8-bit control word, which is inputted via eight parallel control lines. As will be explained later, this control word controls which of the bits 0-7 of the data word applied to the data inputs is outputted at a 1-bit data output. This 1-bit data output in the drawing is the upper of two outputs shown and is connected with one input E2 of the associated memory element. The other output is an output for a control signal and is connected with an input SLE2 of the associated memory element.

The control of the multiplex circuits M0-M127 is now carried out as follows:

An address generator 68, clocked with the writing clock ST (also shown in FIG. 3A), as will be explained in greater detail by means of FIG. 6, generates with each pulse of the writing clock a specific memory address, which can assume 128 states, since 128 memory cells are present. To represent such a memory address, the address generator has 128 parallel output lines, which are designated by A0-A127 in the drawing. A specific address is now simply represented by the fact that the identically numbered output line shows the binary state 1 and all other show the binary state 0. For address 0, the output line A0 thus has a 1 and all other output lines have a 0, while for an address of, e.g., 121, the output line A121 has a 1 and all others have a 0.

A control word for one of the multiplex circuits M0-M127 is now formed by the fact that a specific group of eight of the 128 parallel output lines of the address generator is connected with the control inputs of the multiplex circuit. As shown in the drawing, for the multiplex circuit M0 this represents the eight lines A121-A0, i.e., A121, A122, A123, A124, A125, A126, A127, A0. For the multiplex circuit M1, it is the lines A122-A1, for the multiplex circuit M2, it is the lines A123-A2. The selection of the lines for the other multiplex circuits that are shown in the drawing is also represented in the drawing. For the multiplex elements not shown, the selection of the lines by continuation can be understood without further explanation.

The control of the multiplex circuits M0-M127 produced in this manner will now be explained by means of an example. The states of the input and output lines considered for the example are shown in parentheses in the drawing. The case is considered in which the address generator 68 is just outputting the address 0. As mentioned above, in this case the output line A0 has the state 1, and all other output lines A1-A127 have the state 0. The lines shown are applied in the sequence indicated by the numbering to the eight control inputs of the multiplex circuit, so that, in the example considered, the multiplex circuit M0, as shown schematically, receives a 1 at its first control input (considered from bottom to top), the multiplex circuit M1 receives a 1 at its second control input (to which the line A0 is applied), the multiplex circuit M3 receives a 1 at its third control input, etc., and the multiplex circuit M8 does not receive a 1 at any of its control inputs, since the line A0 is not applied to any of its control inputs.

For this state of the control inputs, the multiplex circuit M0 switches the first bit 0 of the data word, the multiplex circuit M1 switches the second bit 1 of the data word, the multiplex circuit M2 switches the third bit 2 of the data word, etc., and the multiplex circuit M7 switches the last bit 7 of the data word through to its 1-bit data output. At its control output, each of the indicated multiplex circuits outputs a 1 precisely where any of its control lines shows the state 1. In the example considered, this involves only the multiplex circuits M0-M7; M8 and the others output a 0 at their control input, as shown for M8. The 1 at the control input SLE2 of the memory cells SD0-SD7 has the effect in the memory cells that the data word containing bits 0-7 appearing at the outputs of the multiplex circuit M0-M7 is taken over into these memory cells SD0-SD7 if a pulse of the writing clock ST appears at the clock input. Those memory cells not receiving a 1 at their control input SLE2 (Select E2), upon receipt of a clock pulse, store their starting state into a data input E1, i.e., they retain their previous state. In the example under consideration, this is the case for the memory cell SD8 and the other memory cells through SD127, for which it is therefore irrelevant which of the bits 0-7 of a data word they receive from the associated multiplex circuit if none of their eight control lines shows the state 1.

The output lines of the memory cells SD0-SD127 are designated by Q0, Q1, etc. They are, in each case, returned to an input E1 of the memory cell.

From the explanation of an example given so far, it can be readily seen that the circuit arrangement shown has the property of writing a data word into the eight memory cells, consisting of SD1 and the seven following cells, for any memory address i (i is between 0-127) generated by the address generator.

The circuit is thus also in a position, as shown in FIG. 3B, to overwrite already written-in data words in whole or in part during the next writing-in process, by the fact that the address generator increases the writing address not by eight, but, for example, only by six, so that the last two bits of a written-in word are overwritten when the next word is written in.

Figure 5B:
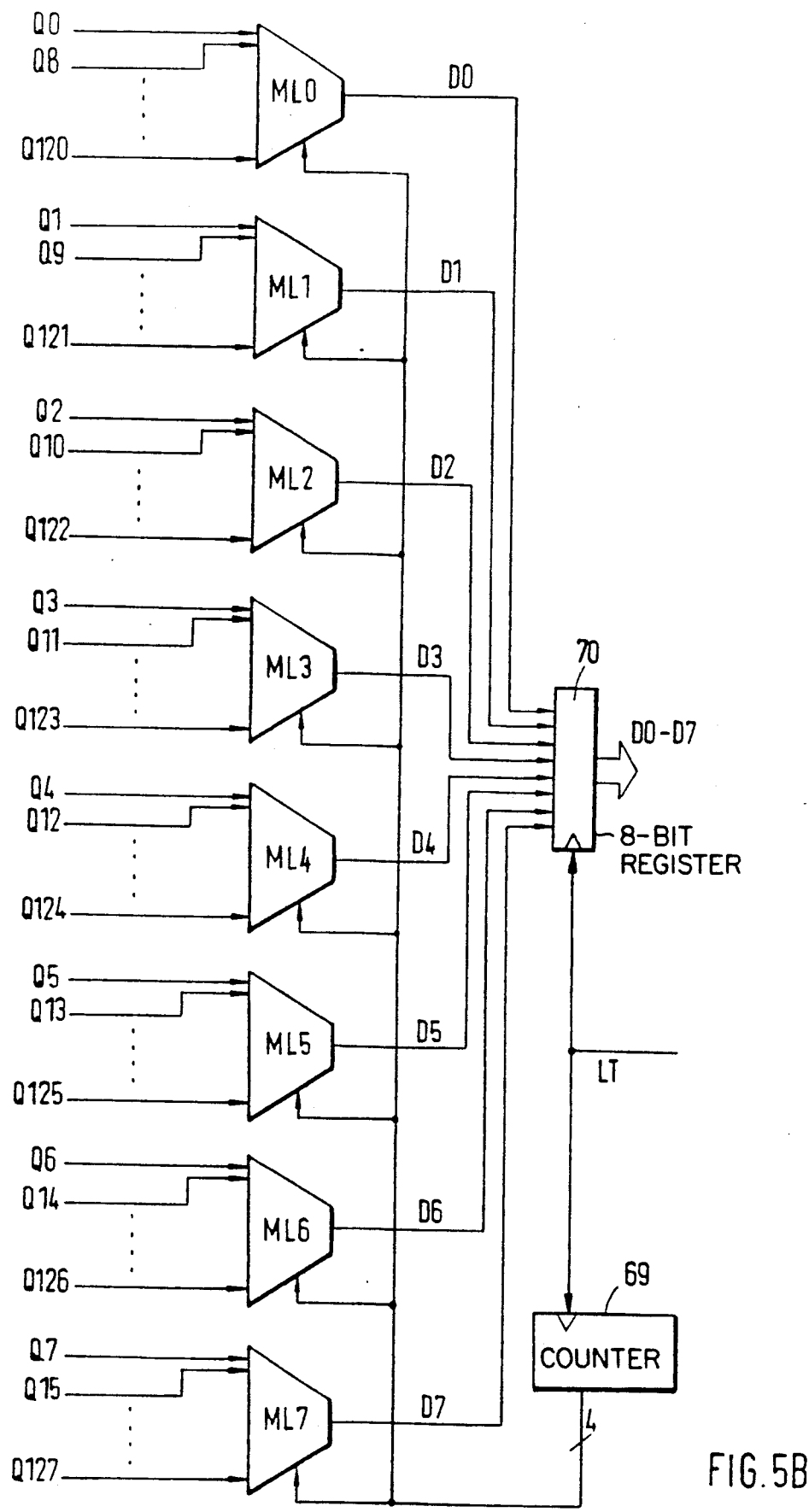

FIG. 5B shows an example of a logic circuit for readout from the memory and a read controller, which are provided to read out the contents of the memory, as shown in FIG. 3B, successively word by word. The logic circuit in this case consists of a parallel arrangement of eight multiplex circuits ML0-ML7. Each of the eight multiplex circuits has 16 data inputs and a 4-bit control input, and all eight multiplex circuits receive a 4-bit control word common to all at their 4-bit control input.

The 8×16 data inputs of the eight multiplex circuits are connected as follows with the 128 memory outputs Q0-Q127 (FIG. 5A). The first inputs of the multiplex circuits ML0-ML7 are connected with the first group Q0-Q7 of output lines of the elastic memory, namely ML0 with Q0, ML1 with Q1, etc., through ML7 with Q7, in each case at the first input—in the drawing, the top input of the multiplex circuits. In a corresponding manner, the second inputs of the multiplex circuits are in each case connected with the second group of successive memory outputs Q8-Q15, etc., so that, finally, the 16th inputs of the multiplex circuits are connected with the last group Q120-Q127 of the output lines of the memory.

The control word common to all, applied to the control inputs of the multiplex circuits ML0-ML7, the so-called reading address, is determined by a 4-bit-counter 69, which counts cyclically from 0-15. The multiplex circuits ML0-ML7 have the property that, upon application of the reading address 0 (binary 0000), they switch through their first input to the output in each case, i.e., in the case of reading address 0, the word outputted at the memory outputs Q0-Q7 appears as a data word at the outputs D0-D7 of ML0-ML7. For the reading address 1 (binary 0001), the multiplex circuits in each case switch through their second input, i.e., the bits outputted at the outputs Q8-Q15 of the memory, as a data word to their outputs D0-D7, and for reading address 15 (binary 1111), they switch through their 16th inputs, i.e., the bits from the memory outputs Q120-Q127, to their outputs.

In this way, as shown in FIG. 3B, the memory is read out word for word in parallel. Each read-out word is inputted from the outputs of the multiplex circuits D0-D7 in parallel into a register 70, in each case with a pulse of the reading clock. The cyclically-operating 4-bit counter 69 is thus the read controller 66 shown in FIG. 3A.

It should also be mentioned that (in a circuit not shown) the writing addresses generated by the address generator 68 of FIG. 5A are continuously compared to the reading addresses generated by the counter 69 of FIG. 5B and that the local oscillator mentioned in connection with FIG. 3A, which generates the reading clock LT, is controlled by a phase control loop in such a way that the reading addresses remain a suitable distance behind the writing addresses.

An exemplifying embodiment of the address generator 68 shown in FIG. 5A will now be explained by means of FIG. 6. A 7-bit adder 80 receives its output word with seven bits at one adder input and, at another adder input, receives a word with four bits, which is outputted by a multiplex circuit 81 at its data output. The writing clock ST is applied to its clock input, so that the adder 80 with each pulse of the writing clock, increases the value of its output word by the value of its 4-bit input word received from the multiplex circuit 81. The multiplex circuit 81 has four input lines with four bits each, and each of the 4-bit input lines has a permanent state representing the binary representation of a specific number. For a first input line, this is the number 8 in binary representation (8b), for a second input line it is the number 7 in binary representation (7b), for a third input line is the number 6 in binary representation (6b), and for a fourth input line it is the number 0 in binary representation (0b). By means of two bits at a control input of the multiplex circuit 81, coming from the demultiplexer controller 62 (FIG. 3A), the multiplex circuit 81 can be controlled in such a way that either the number 0 or the number 6 or the number 7 or the number 8, in each case in binary representation, is outputted and is inputted into the adder 80, so that the adder optionally increases its counter reading by 0, 6, 7 or 8.

Figure 6:
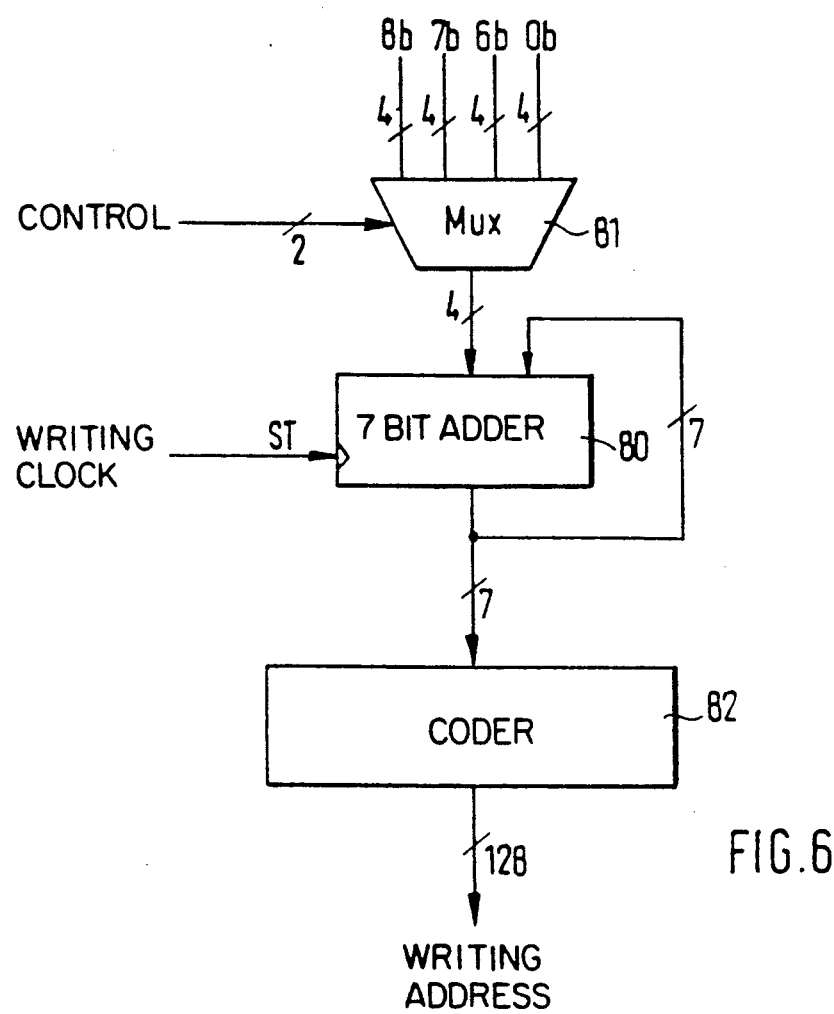
FIG. 6 shows an exemplifying embodiment of the address generator 68 of FIG. 5A.

With each pulse of the writing clock, a writing address thus appears at the output of the adder in a 7-bit binary representation, which differs from the preceding one by 0, 6, 7 or 8, so that the address generator according to FIG. 6 has the property mentioned in connection with the preceding figures of generating writing addresses succeeding each other at a controllable spacing.

A coder 82 converts every writing address from the binary code into a 1-of-128 code, in that, as explained by means of FIG. 5A, it represents each of the 128 addresses by a logical 1 on one of 128 parallel output lines. These are finally the writing addresses outputted by the address generator 68 in FIG. 5A.

The address generator 56 of FIG. 4B for generation of the reading addresses is constructed essentially like the one shown in FIG. 6, with the difference that the coder 82 is omitted, i.e., the binary representation of the addresses can be used directly as reading addresses, and with the additional difference that the reading clock is applied to the clock input of the adder instead of the writing clock, and with the final difference that the two bits for control of the multiplex circuit 81 come from the multiplexer controller 31 according to FIG. 2A.

I claim:

1. A multiplexer, for combining a digital signal and digital additional information into a time-division multiplex signal of the type having a pulse frame structured from successive n-bit words and containing in at least one word position a stuffing word which contains stuffing bits of undefined state in at least its last bit position and bits of the digital signal in the other bit positions, comprising:
    means for forming the pulse frame by combining the successive n-bit words, word by word;
    means for forming the stuffing word by replacing at least one bit of the digital signal at the end of a word with a stuffing bit; and
    means for repeating the replaced bits of the digital signal at the beginning of a next adjacent word.

2. A multiplexer as described in claim 1, characterized in
    that it includes an elastic memory having a plurality of memory cells with successive addresses, a serial-to-parallel converter, and an associated write controller,
    that the serial-to-parallel converter converts the digital signal into successive n-bit words of arbitrary word-clock phase.
    that the write controller and the elastic memory operate so that the n-bit words are written into the elastic memory word by word and in parallel, such that successive bits of the digital signal occupy memory cells with successive addresses,
    that the elastic memory has a read controller associated therewith which is controlled by a multiplexer controller controlling the formation of the pulse frame,
    that the read controller controls the readout from the elastic memory in such a way that the n-bit words of the pulse frame, which consist of bits of the digital signal, and the stuffing word are formed by reading out stored bits of the digital signal word by word, and
    that the read controller shifts the read addresses by n after readout of each n-bit word of the pulse frame which is to contain only bits of the digital signal, and by only n-x after readout of each stuffing word, where x is the number of stuffing bits to be contained in the stuffing word.

3. A demultiplexer, for separating a time-division multiplex signal composed of a digital signal, digital additional information, and stuffing bits, the pulse frame of the time-division multiplex signal structured from successive n-bit words and containing in at least one word position a stuffing word which contains a stuffing bit in at least its last bit position and bits of the digital signal in the other bit positions, said demultiplexer comprising:
    a demultiplexing circuit which separates the time-division multiplex signal word by word, in accordance with the structure of the pulse frame, into n-bit words containing no bits of the digital signal and into n-bit words containing bits of the digital signal;
    an elastic memory into which the n-bit words containing bits of the digital signal, including the stuffing words, are written word by word, such that memory cells occupied with stuffing bits during write-in of a stuffing word are overwritten during write-in of the next word; and
    means for recovering the digital signal by reading out the bits stored in the elastic memory.

4. A demultiplexer as described in claim 3, characterized in
    that the elastic memory has a plurality of memory cells with successive addresses,
    that it includes a write controller which shifts the write addresses by n after write-in of each n-bit word of the sequence of the n-bit words containing bits of the digital signal, and by only n-x if the written word was a stuffing word, where x is the number of stuffing bits contained in the stuffing word, and
    that it includes a read controller which controls the readout so that the stored bits are read according to their order in the digital signal.

5. A demultiplexer as described in claim 3, characterized in that words containing no bits of the digital signal are also written word by word into the elastic memory but are overwritten during write-in of the next word.

6. A demultiplexer as described in claim 4, characterized in that words containing no bits of the digital signal are also written word by word into the elastic memory but are overwritten during write-in of the next word.

7. A demultiplexer as described in claim 4, wherein the write controller shifts the write addresses by n-x after write-in of each n-bit word into the elastic memory, where x is the number of bits in the n-bit word which are not bits of the digital signal.

8. A demultiplexer as described in claim 5, wherein the write controller shifts the write addresses by n-x after write-in of each n-bit word into the elastic memory, where x is the number of bits in the n-bit word which are not bits of the digital signal.

9. A demultiplexer as described in claim 6, wherein the write controller shifts the write addresses by n-x after write-in of each n-bit word into the elastic memory, where x is the number of bits in the n-bit word which are not bits of the digital signal.

* * * * *